United States Patent
Lehmann et al.

(10) Patent No.: US 12,296,779 B2
(45) Date of Patent: May 13, 2025

(54) FASTENING DEVICE AND AIRBAG MODULE

(71) Applicant: JOYSON SAFETY SYSTEMS GERMANY GMBH, Aschaffenburg (DE)

(72) Inventors: Maximilian Lehmann, Mömbris (DE); Felix Hirsch, Mespelbrunn (DE); Nick Eckert, Berlin (DE)

(73) Assignee: JOYSON SAFETY SYSTEMS GERMANY GMBH, Aschaffenburg (DE)

( * ) Notice: Subject to any disclaimer, the term of this patent is extended or adjusted under 35 U.S.C. 154(b) by 0 days.

(21) Appl. No.: 18/136,795

(22) Filed: Apr. 19, 2023

(65) Prior Publication Data
US 2024/0351547 A1 Oct. 24, 2024

(51) Int. Cl.
*B60R 21/2338* (2011.01)
*B60R 21/217* (2011.01)

(52) U.S. Cl.
CPC ........ *B60R 21/2338* (2013.01); *B60R 21/217* (2013.01); *B60R 2021/23384* (2013.01); *B60R 2021/23388* (2013.01)

(58) Field of Classification Search
CPC ...... B60R 21/2338; B60R 2021/23384; B60R 2021/23388; B60R 21/217
See application file for complete search history.

(56) References Cited

U.S. PATENT DOCUMENTS

| | | | |
|---|---|---|---|
| 8,109,533 B2 * | 2/2012 | Sauer | B60R 21/201 280/736 |
| 11,613,227 B2 * | 3/2023 | Horton | B60R 21/239 280/743.2 |
| 11,865,997 B2 * | 1/2024 | Kawamura | B60R 21/203 |

(Continued)

FOREIGN PATENT DOCUMENTS

| | | |
|---|---|---|
| DE | 10 2011 014 869 A1 | 9/2012 |
| DE | 10 2012 013 212 A1 | 1/2014 |
| DE | 10 2018 101 155 A1 | 7/2019 |

(Continued)

OTHER PUBLICATIONS

WO-2014106567-A1 (machine translation) (Year: 2014).*

*Primary Examiner* — Jason D Shanske
*Assistant Examiner* — Joselynn Y Sliteris
(74) *Attorney, Agent, or Firm* — Gordon Rees Scully & Mansukhani, LLP

(57) ABSTRACT

It is provided a fastening device for fastening a cord-like element to an element of an airbag module. The fastening device comprises at least two half shells, which each have an elongated shape and each extend along a longitudinal axis and are arranged relative to each other in such a way that together they define a cavity. Furthermore, the fastening device comprises a web, which connects the at least two half shells to each other along a first direction transversely to the longitudinal axis of the half shells and has a predetermined breaking point, and a pyrotechnical actuator, which is at least sectionally arranged in the cavity and is configured to (Continued)

break up the fastening device at the predetermined breaking point when triggered. The at least two half shells and the web form a receptacle for positively fastening the cord-like element to the fastening device.

16 Claims, 4 Drawing Sheets

(56) References Cited

U.S. PATENT DOCUMENTS

2011/0042926 A1    2/2011   Mayer et al.
2015/0343982 A1   12/2015   Fechner et al.

FOREIGN PATENT DOCUMENTS

| DE | 10 2019 111 029 A1 | 10/2019 | |
|----|---------------------|---------|---|
| EP | 2 958 776 B1 | 10/2017 | |
| WO | 2005/087549 A1 | 9/2005 | |
| WO | WO-2014106567 A1 * | 7/2014 | ......... B60R 21/2338 |

\* cited by examiner

FASTENING DEVICE AND AIRBAG MODULE

BACKGROUND

This disclosure relates to a fastening device for fastening a cord-like element to an element of an airbag module and relates to an airbag module comprising such a fastening device. Fastening devices for fastening a cord-like element to an element of an airbag module are known for example from DE 10 2011 014 869 A1, DE 10 2012 013 212 A1, DE 10 2018 101 155 A1, DE 10 2019 111 029 A1 or US 2011/0 042 926 A1.

The cord-like (or also band-like) element can be part of an adaptive gas bag component that serves for controlling the gas bag volume. An adaptive gas bag component, which can take at least two different states or positions, for example can be a catch strap or a cover of an outflow opening or a diffuser. The cord-like element serves to hold the adaptive gas bag component in one of the states by cooperating with the fastening device. Without cooperating with the fastening device, the cord-like element can take another of the at least two states. To implement the control function, the fastening device generally is designed such that on the one hand it can serve for fastening the cord-like element and on the other hand can specifically release the cord-like element.

For example, the cord-like element can be fastened to the element of the airbag module by means of a tear seam or shiftable pins. In the case of a tear seam, however, its secure function must be checked by means of expensive tests. At high acceleration, shiftable pins can move in an uncontrolled way.

SUMMARY

An object underlying the proposed solution consists in creating a fastening device for fastening a cord-like element to an element of an airbag module, which ensures a secure fastening and reliable release of the cord-like element and in addition is inexpensive and saves installation space.

This object is solved by a fastening device with features as described herein.

Accordingly, the fastening device according to the solution, which is configured to fasten a cord-like or band-like element to an element of an airbag module, comprises at least two half shells that each have an elongated shape and each extend along a longitudinal axis and are arranged relative to each other in such a way that together they define a cavity. The longitudinal axes in particular extend parallel to each other. The half shells for example can approximately have the shape of a shell surface of a bisected cylinder or bisected frustum. Other shapes are also conceivable. At or close to a first end, the half shells also can have a cover portion extending transversely to the longitudinal axis. On the other hand, a second end of the half shells, which is located opposite the first end, can be open. Via a web, the at least two half shells are connected to each other along a first direction transversely to the longitudinal axis of the half shells. The web for example can connect the cover portions to each other. The web has a predetermined breaking point. The predetermined breaking point for example extends along a second direction that extends perpendicularly to the first direction and to the longitudinal axis of the half shells, respectively. There is provided a pyrotechnical actuator that is configured to break up the fastening device at the predetermined breaking point when triggered. The pyrotechnical actuator therefor is at least sectionally arranged in the cavity that is defined by the at least two half shells. The pyrotechnical actuator can protrude beyond the second end of the half shells, which is located opposite the first end. Furthermore, it can be provided that the pyrotechnical actuator is arranged at a distance from the web. The at least two half shells or a portion of the at least two half shells on the one hand and the web on the other hand form a receptacle for positively fastening the cord-like element to the fastening device. Due to the positive connection between the cord-like element and the fastening device, the assembly in a more complex system such as an airbag module can be simplified.

The material thickness of the web, the size of the predetermined breaking point, the length of the half shells along the longitudinal axis and the pyrotechnical actuator can be adjusted to each other such that by action of the pyrotechnical actuator the predetermined breaking point will fail or break from a given action of force of the cord-like element on the fastening device or at a given time. In particular by choosing the material thickness of the web and the size of the predetermined breaking point on the one hand, a maximum force can be defined, which the web having the predetermined breaking point must withstand. On the other hand, by cleverly adjusting in particular the length of the half shells and the pyrotechnical actuator (or the force with which the pyrotechnical actuator acts on the half shells when triggered), it can be achieved that the predetermined breaking point fails very quickly and reliably when the said maximum force is exceeded. When permitted by the available installation space, the length of the half shells can be increased and the force of the pyrotechnical actuator can be reduced correspondingly, in order to generate the required moment that leads to the failure of the predetermined breaking point by making use of the leverage effect.

According to one embodiment, the at least two half shells in a state of rest are connected to each other only via the web and apart from this do not contact each other. It thus is achieved that after failure of the predetermined breaking point the at least two half shells are completely separated from each other and the previously existing connection between the fastening device and the cord-like element is reliably released upon failure of the predetermined breaking point.

As seen along the second direction, the web can be arranged substantially centrally on the at least two half shells. Along the second direction, the web can have a smaller extension than the at least two half shells. Furthermore, the web can have a smaller extension along the longitudinal axis of the half shells than the at least two half shells. In particular, it can be provided that the web is arranged at or close to the first end of the at least two half shells. The cord-like element can be properly arranged between the at least two half shells on this side of the web, underneath the web and on the other side of the web.

According to one embodiment, at least one of the at least two half shells has at least one protrusion that is directed towards the other one of the at least two half shells. This half shell also can have two protrusions, which are arranged on either side of the web as seen along the second direction and which are each directed towards the other one of the at least two half shells. The at least two half shells also can each have at least one such protrusion or can each have two of such protrusions. In half shells that approximately have the shape of a shell surface of a bisected cylinder or bisected frustum, the protrusions can already be formed by the lateral end portions of these shapes directed along the first direction. The receptacle for positively fastening the cord-like element to the fastening device can be defined by the at least one protrusion on the one hand and the web on the other hand, as seen along the second direction (in each case perpendicularly to the first direction and to the longitudinal axis of the half shells). If two or more protrusions are provided, the receptacle also can comprise two regions that are separated from each other by the web. The two regions then extend on either side of the web between the web and one of the two or more protrusions, respectively.

To allow the receptacle to provide for positively fastening the cord-like element to the fastening device, the receptacle can have an extension along the first direction that is greater than a distance between the at least two half shells along the first direction in the region of the at least one protrusion, and along the longitudinal axis of the at least two half shells as seen at the height of the web. Thus, the at least one protrusion forms a barrier for the cord-like element at the height of the web, when the same is moved out of the receptacle along the second direction away from the web.

It can be provided that a distance between the at least two half shells in the region of the at least one protrusion is not constant as seen along the longitudinal axis of the half shells. This distance is measured along the first direction. In particular, this distance can be smaller in the region of the web as seen along the longitudinal axis of the half shells than at an end of the half shells that faces away from the web (than at the second end). For example, the distance in the region of the second end can decrease in the direction of the first end. It can be provided that the distance at the second end is greater than a diameter of the cord-like element that is to be fastened properly by means of the fastening device. Thus, the introduction of the cord-like element via the second end into the receptacle of the fastening device along the longitudinal axis can be simplified. Furthermore, it can be provided that as seen along the longitudinal axis from the second to the first end of the half shells said distance initially is greater than the diameter of the cord-like element, decreases until it is smaller than the diameter of the cord-like element and subsequently remains constant or increases again, but in doing so remains smaller than the diameter of the cord-like element. This can impede slipping of the cord-like element out of the fastening device along the longitudinal axis of the half shells via their second end.

Furthermore, in the region of the at least one protrusion a distance between the at least two half shells as seen along the second direction, which is directed perpendicularly to the first direction and to the longitudinal axis of the half shells, respectively, can decrease down to the receptacle with decreasing distance to the web. This creates an insertion aid for introducing the cord-like element into the receptacle transversely to the longitudinal axis.

According to one embodiment, the at least two half shells are identical in shape. The at least two half shells can be arranged mirror-symmetrically to each other with respect to a plane of symmetry, wherein the plane of symmetry is perpendicular to the first direction.

This solution also relates to an airbag module comprising a retaining plate and a gas bag that is fastened to the retaining plate. The retaining plate can be a diffuser or a gas bag housing. The gas bag of the airbag module cooperates with an adaptive gas bag component that comprises a cord-like element or is fastened to a cord-like element. Instead of the cord-like element, this can also be a band-like element. The adaptive gas bag component serves to control the gas bag volume in particular in the course of the inflation process. The adaptive gas bag component can be a catch strap or a cover of an outflow opening or a diffuser.

The airbag module according to the solution comprises a fastening device for fastening the cord-like element to an element of the airbag module according to one of the embodiments described above. By means of the fastening element, at least part of the cord-like element is maintained in a defined position/state in the state of rest of the pyrotechnical actuator. In case the pyrotechnical actuator of the fastening device is triggered, the part of the cord-like element can then be released by the fastening device. The part of the cord-like element thereby can move out of the defined position/state and for example take another (defined) position/state.

According to one embodiment, the fastening device is arranged in the airbag module in such a way that at least in the region of the web or in a major part thereof the at least two half shells have no point of contact in a direction transversely to their longitudinal axis and in particular do not rest against an element of the airbag module. In case the pyrotechnical actuator is triggered, the half shells have some space available in order to move transversely to the longitudinal axis and cause the breaking up of the fastening device at the predetermined breaking point by making use of the leverage effect. The fastening device can also be arranged in the airbag module in such a way that the at least two half shells rest against an element of the airbag module in a direction transversely to their longitudinal axis only in an end region of the half shells that faces away from the web. The fastening device can be held in the airbag module at a maximum distance to the web, in order to impair the leverage effect as little as possible.

To be able to positively fasten the cord-like element to the fastening device, it can be provided that the distance between the at least two half shells as seen along the first direction in the region of the at least one protrusion, and as seen along the longitudinal axis of the at least two half shells in the region of the web, is smaller than a diameter of the cord-like element. A movement of the cord-like element between the half shells out of the receptacle can be impeded along the second direction.

BRIEF DESCRIPTION OF THE DRAWINGS

The solution will be explained in detail below by means of exemplary embodiments with reference to the Figures.

DETAILED DESCRIPTION

Figure 1:
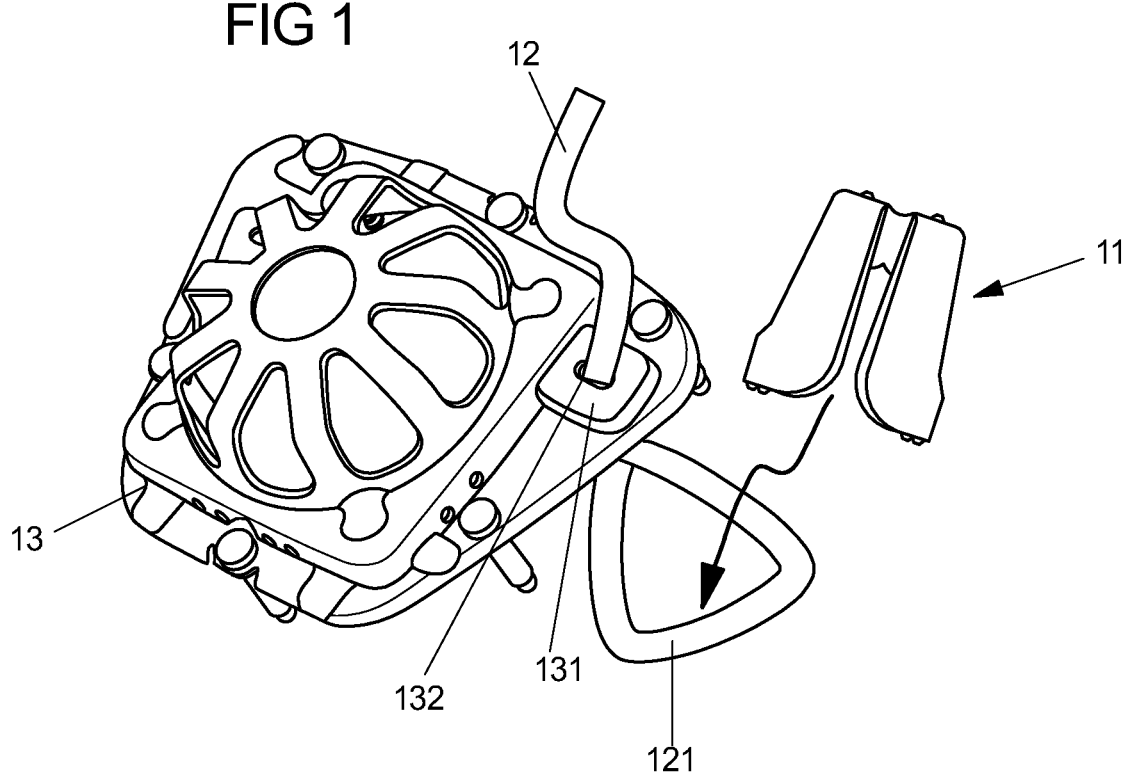
FIG. 1 shows a schematic representation of a fastening device according to an embodiment together with a cord-like element and a retaining plate of an airbag module.
Figure 2:
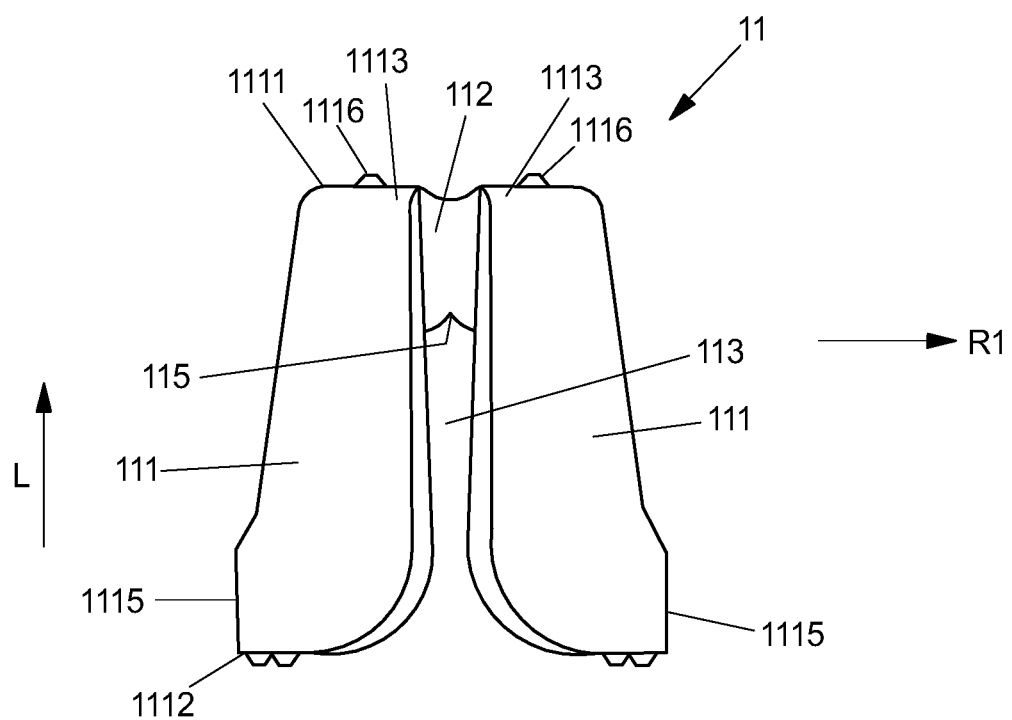
FIG. 2 shows a side view of the fastening device of FIG. 1.
Figure 3:
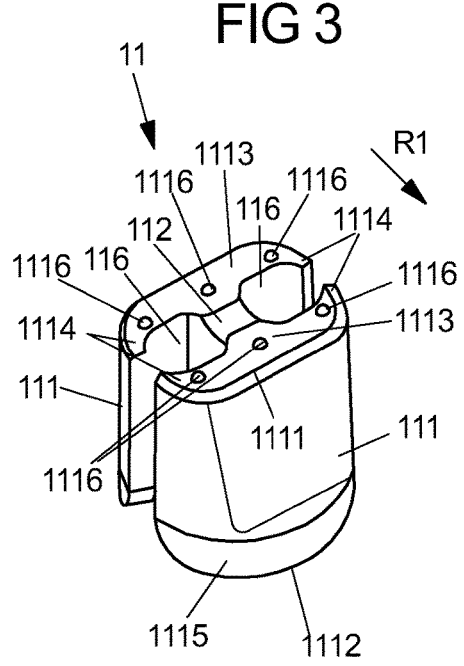
FIG. 3 shows a perspective representation of the fastening device of FIG. 1.
Figure 4:
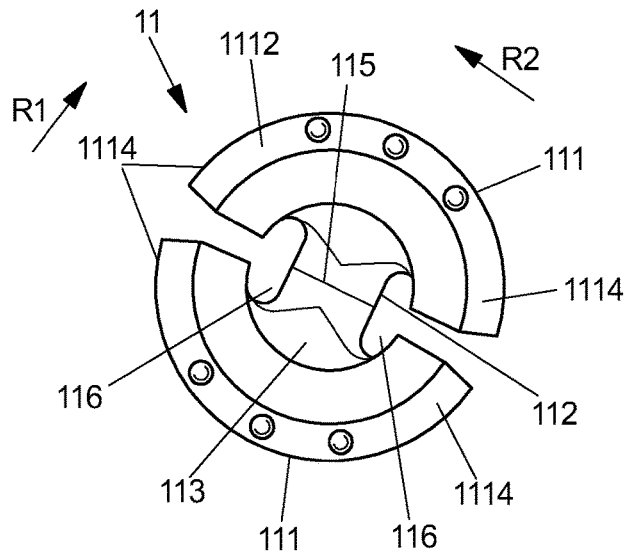
FIG. 4 shows a top view of the underside of the fastening device of FIG. 1.

FIG. 1 shows a fastening device 11 together with a cord-like element 12 and a retaining plate 13 of an airbag module 1. The fastening device 11 serves for fastening the cord-like element 12 to the retaining plate 13. The retaining plate 13 is formed as a diffuser. The retaining plate 13 includes a receiving area 131 for the fastening device 11, in which the fastening device 11 is properly arranged. In the receiving area 131, the retaining plate 13 also includes a lead-through opening 132 through which the cord-like element 12 is to be guided for the purpose of fastening to the retaining plate 13. Alternatively, the lead-through opening 132 can be located beside the receiving area 131. At one end, the cord-like element 12 has a loop-like portion 121. At its other end, the cord-like element 12 can be fastened to an adaptive gas bag component. The loop-like portion 121 is provided for cooperating with the fastening device 11. The fastening device 11 is of clamp-like design and is shown in FIG. 2 on an enlarged scale. FIGS. 3 and 4 show further views of the fastening device 11.

The fastening device 11 comprises two half shells 111, which are connected to each other along a first direction R1 only via a web 112. The half shells 111 have an elongated shape and each extend along their longitudinal axis L (perpendicularly to the first direction R1). The half shells 111 are arranged relative to each other in such a way that their longitudinal axes L are parallel to each other. The half shells 111 also are arranged relative to each other in such a way that they define a cavity 113 that is located between the two half shells 111. The web 112 is formed in a region of a first end 1111 of the half shells 111. In particular, the web 112 extends from the first end 1111 of the half shells 111 along the longitudinal axis L and has a smaller extension along the longitudinal axis L than the half shells 111. At their first end 1111, the half shells 111 each have a cover portion 1113 that extends transversely to the longitudinal axis L. On a side of the cover portions 1113 that faces away from the cavity 113, a plurality of elevations are formed, which proceeding from the respective cover portion 1113 protrude along the longitudinal axis L. The elevations 1116 are uniformly distributed over the cover portions 1113. In the top view of the cover portions 1113, the elevations 1116 each are point-shaped. Other shapes are also conceivable. The elevations 1116 serve as a tolerance compensation in order to securely hold a pyrotechnical actuator described below in its connection. With respect to the longitudinal axis L, the cover portions 1113 are formed at the same height. The cover portions 1113 are connected to each other via the web 112. The cover portions 1113 and the web 112 thus in part delimit the cavity 113 in the region of the first end 1111. On the other hand, the fastening device is open at a second end 1112 of the half shells 111, which is located opposite the first end 1111.

At the second end 1112 of each half shell 111 a flange-like thickening 1115 at least sectionally is formed on the outside, which protrudes transversely to the longitudinal axis L. The flange-like thickening 1115 serves for fastening the fastening device 11 for example in an airbag module. Proceeding from the first end 1111 of each half shell 111 towards the respective flange-like thickening 1115, the fastening device 11 widens at least transversely to a second direction R2 that is perpendicular to the first direction R1 and to the longitudinal axis L, respectively. The extension of the fastening device 11 along the first direction R1 therefore is smaller at the first end 1111 than at the second end 1112.

The half shells 111 are shaped or curved such that they each have two protrusions 1114. Each protrusion 1114 is directed towards the respectively other half shell 111 along the first direction R1 and extends along the entire length (along the longitudinal axis L) of the half shell 111. Each half shell 111 has a protrusion 1114 on either side of the web 112, respectively. The protrusions 1114 form an end of the half shells 111 as seen along the second direction R2. The protrusions 1114 of the one half shell 111 are located opposite the protrusions 1114 of the other half shell 111 along the first direction R1.

Figure 8:
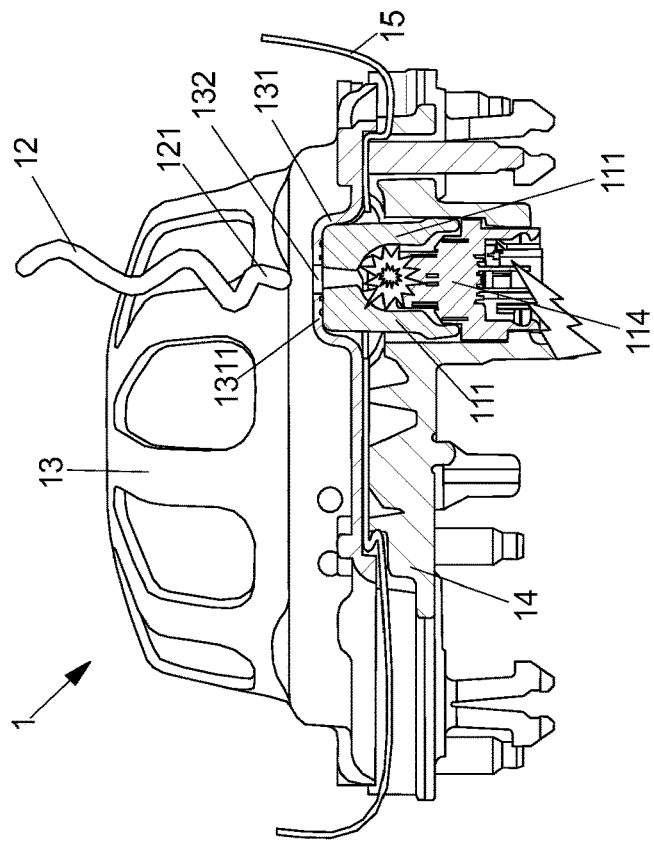
FIG. 8 shows an airbag module with a fastening device of FIG. 1, wherein a pyrotechnical actuator is in a state of rest and the cord-like element is fastened to the retaining plate by means of the fastening device.
Figure 9:
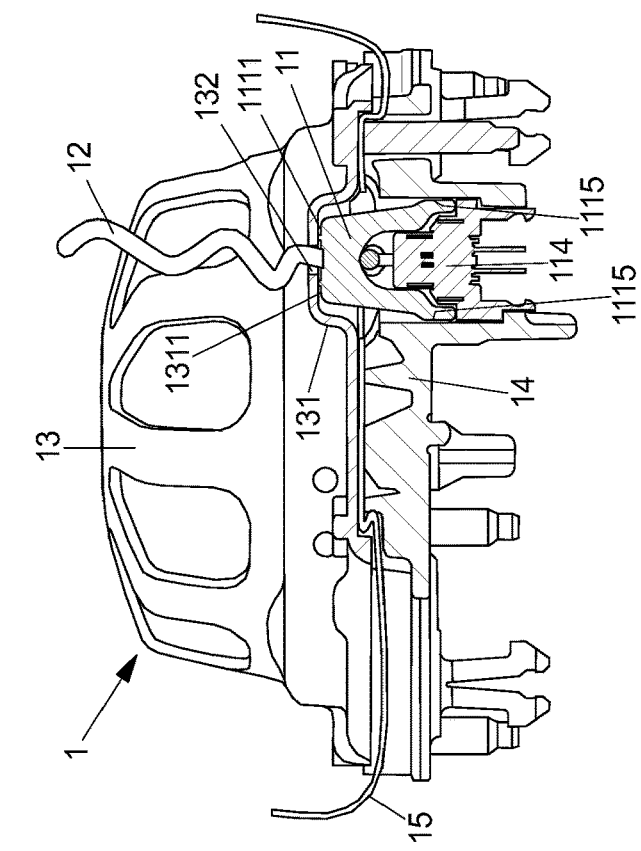
FIG. 9 shows the airbag module of FIG. 8, after activation of the pyrotechnical actuator.

The fastening device 11 furthermore comprises the pyrotechnical actuator 114 briefly mentioned already, which is to be arranged properly in the cavity 113 (FIG. 8). The pyrotechnical actuator serves to break the web 112 when triggered. For this purpose, a predetermined breaking point 115 also is formed in the web 112, which extends along the second direction R2. The predetermined breaking point 115 is formed on the side of the web 112 facing the second end 1112.

To fasten the cord-like element 12 to the fastening device, the fastening device 11 includes a corresponding receptacle 116 for the cord-like element 12. The receptacle 116 is located in the region of the web 112. The receptacle 116 has two regions, which along the second direction R2 are each delimited by the web 112 and the protrusions 1114, wherein one region is located on this side of the web 112 and one region is located on the other side of the web 112. The receptacle 116 is substantially U-shaped and also includes a region that extends on a side of the web 112 which faces away from the first end 1111 of the half shells 111. This region connects the two above-mentioned regions (on either side of the web 112) to each other.

Figure 5:
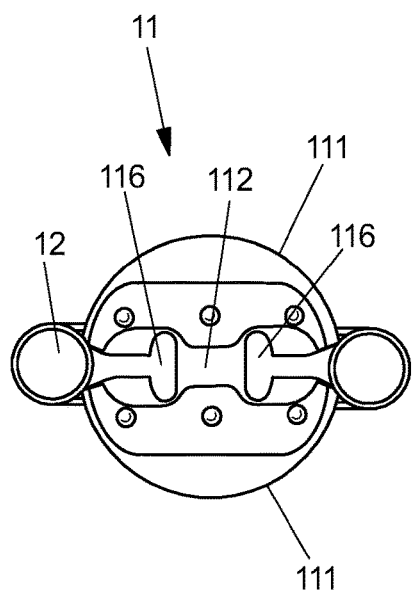
FIGS. 5-7 show various stages of fastening the cord-like element to the fastening device with a top view of the upper side of the fastening device of FIG. 1.
Figure 6:
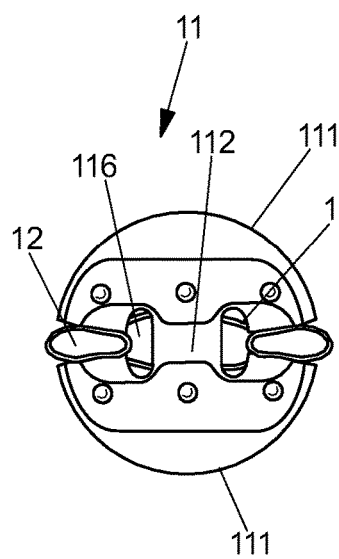
Figure 7:
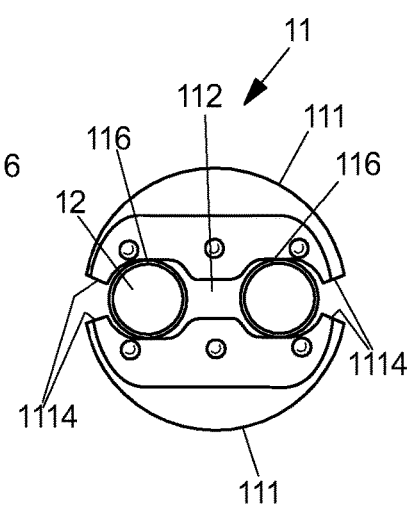

At the height of the web 112, the distance between the protrusions 1114 located opposite each other along the first direction R1 is smaller than the distance of the half shells 111 along the first direction R1 in the region of the receptacle 116, and in particular smaller than the diameter of the cord-like element 12 that is provided for fastening to the fastening device 11 (FIGS. 5 to 7). In this way, the cord-like element is prevented from laterally slipping out of the receptacle 116 after it has been arranged properly in the receptacle 116, as shown in FIG. 7. Furthermore, the distance between the protrusions 1114 at the second end 1112 is greater than at the first end 1111 of the half shells 111 and greater than the diameter of the cord-like element 12. Thus, introducing the loop-like portion of the cord-like element 12 into the receptacle 116 via the end 1112 can be simplified. In the region of the second end 1112 the distance between the protrusions 1114 in the direction of the first end 1111 can decrease in a funnel-shaped manner. In the course of the longitudinal axis L from the second end 1112 to the first end 1111, the distance between the mutually opposite protrusions 1114 initially decreases (along the first direction R1) down to a value that in particular is smaller than the diameter of the cord-like element 12, and then increases again or remains constant, and in particular remains smaller than the diameter of the cord-like element 12.

The cord-like element 12 is formed from an (elastically) deformable material, for example from a fabric tape or a fabric cord. In the Figures, the loop-like portion 121 by way of example constitutes a closed ring. This ring is adjoined by a tape. Alternatively, the cord-like element 12 can be a double tape with two strands that are connected to each other at one end of the tape. This end then forms the loop-like portion.

FIG. 8 shows an airbag module 1 with the fastening device 11 in a state fastened to a retaining plate 13 of the airbag module 1. To the fastening device 11, the cord-like element 12 is fastened. In the cavity 113 of the fastening device 1 a pyrotechnical actuator 114 is arranged, which protrudes beyond the second end 1112 of the half shells 111. FIG. 8 shows the state before triggering of the pyrotechnical actuator 114.

The fastening device 11 in part is arranged in a receiving area 131 of the retaining plate 13. With its first end (or the elevations 1116 on the cover portions 1113 at the first end 1111 of the half shells 111), the fastening device 11 rests against a contact surface 1311 of the receiving area 131. A part of the fastening device 11 protrudes out of the receiving area 131. The receiving area 131 is wider (extension parallel to the plane of the contact surface 1311) than the extension of the fastening device 11 transversely to the longitudinal axis L, at least in the region of the fastening device 11 that protrudes into the receiving area 131. Thus, the fastening device 11 rests against the retaining plate 13 only with its first end (with the first end 1111 of the half shells and in particular with the elevations 1116 on the cover portions 1113), and not laterally. In the region of the second end 1112 of the half shells 111 the fastening device 11 is laterally held by a holder 14, which is connected to the retaining plate 13, via the flange-like thickening 1115. With respect to the retaining plate 13 and the holder 14, the fastening device 11 is dimensioned such that in its region of substantially conical design between the first end 1111 and the flange-like thickening 1115 it laterally contacts neither the retaining plate 13 nor the holder 14. In the state of rest of the pyrotechnical actuator 114, the outer surface of the fastening device 11 thus is not contacted with the exception of the flange-like thickening 115 and the elevations 1116 on the cover portions 1113 at the first end 1111 of the half shells 111.

The pyrotechnical actuator 114 also is held and fixed with respect to the fastening device 11 by means of the holder 14. Between the retaining plate 13 and the holder 14, a gas bag 15 also is arranged.

For fastening the cord-like element 12, which at one end has the loop-like portion 121 and with its other end is fastened to an adaptive gas bag component (not shown), the end with the loop-like portion 121 initially is guided through the lead-through opening 132 of the retaining plate 13 so that it protrudes into the receiving area 131 of the retaining plate 13. There, the loop-like portion 121 is guided into the cavity 113 of the fastening device 11 via the second end 1112 and finally is arranged in the receptacle 116 of the fastening device 11. Subsequently, the fastening device 11 and the pyrotechnical actuator 114 are fixed to the retaining plate 13 by means of the holder 14.

When the pyrotechnical actuator 114 is triggered, the web 112 of the fastening device 11 breaks at the predetermined breaking point 115. The two half shells 111 are laterally pressed apart and separated from each other. This is possible because laterally of the half shells 11 (with the exception of the region of the flange-like thickening 115) enough clearance is provided. Breaking up also is facilitated by the elevations 1116 on the cover portions 1113, as the elevations 1116 reduce the contact surface between the first end of the half shells 111 and the contact surface 1311 of the receiving area 131. Friction also is reduced during breaking up. Due to breaking up, the cord-like element 12 is released and can move out through the lead-through opening 132 of the retaining plate 13. The adaptive gas bag component can move out of the previous state and adopt a new state, which for example allows the gas bag volume to increase.

Figure 10:
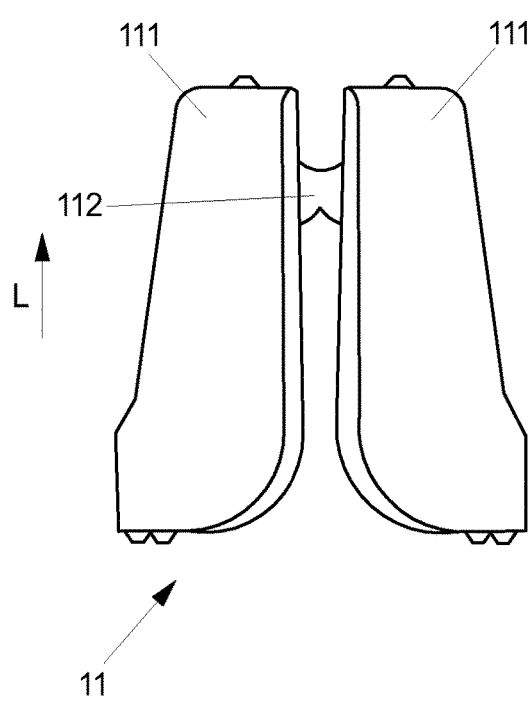
FIG. 10 shows a fastening device according to another embodiment.
Figure 11:
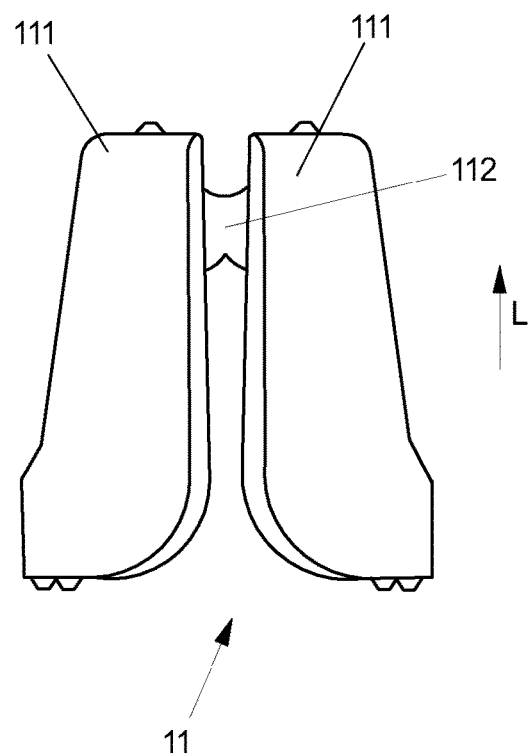
FIG. 11 shows a fastening according to another embodiment.

FIGS. 10 and 11 show two further embodiments of the fastening device 11. In these embodiments, the extension of the web 112 along the longitudinal axis L is reduced as compared to the embodiment that is shown in FIGS. 1 to 9. The web 112 here extends at a distance to the first end 1111 of the half shells 111. The distance between the first end 1111 and the side of the web 112 facing away from the first end 1111 remains unchanged, however. Due to the different material thickness of the web 112 along the longitudinal axis L, the maximum tensile force of the cord-like element 12 can be set, which the web 112 must withstand without breaking. In the embodiment of FIGS. 1 to 9, the maximum tensile force can be 1500 N. In the embodiment of FIG. 10 it is 200 N, and in the embodiment of FIG. 11 500 N.

The invention claimed is:

1. A fastening device for fastening a cord-like element to an element of an airbag module comprising
    at least two half shells, which each have an elongated shape, and each extend along a longitudinal axis and are arranged relative to each other in such a way that together they define a cavity,
    a web, which connects the at least two half shells to each other along a first direction transversely to the longitudinal axis of the half shells and has a predetermined breaking point,
    a pyrotechnical actuator, which is at least sectionally arranged in the cavity and is configured to break up the fastening device at the predetermined breaking point when triggered,
    wherein the at least two half shells and the web form a receptacle for positively fastening the cord-like element to the fastening device.

2. The fastening device according to claim 1, wherein in a state of rest the at least two half shells are connected to each other only via the web and otherwise do not contact each other.

3. The fastening device according to claim 1, wherein along a second direction, which is directed perpendicularly to a plane spanned by the first direction and the longitudinal axis of the half shells, the web has a smaller extension than the at least two half shells.

4. The fastening device according to claim 1 wherein the web has a smaller extension along the longitudinal axis of the half shells than the at least two half shells.

5. The fastening device according to claim 4, wherein the web is arranged at or close to a first end of the at least two half shells.

6. The fastening device according to claim 1, wherein at least one of the at least two half shells has at least one protrusion that is directed towards the other one of the at least two half shells.

7. The fastening device according to claim 6, wherein for positively fastening the cord-like element to the fastening device the receptacle is delimited, in a direction perpendicular to the first direction and to the longitudinal axis of the half shells, by the at least one protrusion on the one hand and by the web on the other hand.

8. The fastening device according to claim 6, wherein the receptacle has an extension along the first direction that is greater than a distance between the at least two half shells as seen along the first direction in a region of the at least one protrusion and along the longitudinal axis of the at least two half shells at the height a height of the web.

9. The fastening device according to claim 6, wherein, as seen along the first direction in a region of the at least one protrusion, there is a distance between the at least two half shells, which, as seen along the longitudinal axis of the half shells, is smaller in a region of the web than at an end of the half shells that faces away from the web.

10. The fastening device according to claim 6, wherein in a region of the at least one protrusion a distance between the at least two half shells decreases as a distance to the web decreases when approaching the receptacle along a second direction, wherein the second direction is perpendicular to the first direction and the longitudinal axis of the half shells.

11. The fastening device according to claim 1, wherein the at least two half shells are identical in shape and are arranged mirror-symmetrically to each other with respect to a plane of symmetry, wherein the plane of symmetry is perpendicular to the first direction.

12. An airbag module comprising a retaining plate and a gas bag that is fastened to the retaining plate, wherein the gas bag cooperates with a cord-like element, wherein there is provided the fastening device according to claim 1, in order to hold at least a part of the cord-like element in a defined position in a state of rest of the pyrotechnical actuator.

13. The airbag module according to claim 12, wherein, when the pyrotechnical actuator of the fastening device is triggered, the part of the cord-like element is released and can move out of the defined position.

14. The airbag module according to claim 12, wherein the fastening device is arranged in the airbag module in such a way that in a region of the web the at least two half shells do not rest at any element of the airbag module in a direction transversely to the longitudinal axis.

15. The airbag module according to claim 12, wherein the fastening device is arranged in the airbag module in such a way that in a direction transversely to the longitudinal axis the at least two half shells rest against an element of the airbag module only in an end region of the half shells that faces away from the web.

16. The airbag module according to claim 12, wherein at least one of the at least two half shells has at least one protrusion that is directed towards the other one of the at least two half shells, wherein the receptacle has an extension along the first direction that is greater than a distance between the at least two half shells as seen along the first direction in a region of the at least one protrusion and along the longitudinal axis of the at least two half shells at a height of the web, and wherein the distance between the at least two half shells as seen along the first direction in the region of the at least one protrusion and along the longitudinal axis of the at least two half shells in a region of the web is smaller than a diameter of the cord-like element.

* * * * *